H. WELLINGTON.
Vapor-Burning Torch.

No. 162,727.

Patented April 27, 1875.

WITNESSES.
Boyd Eliot
John Wm Ripley

Henry Wellington
INVENTOR.

THE GRAPHIC CO.PHOTO-LITH.39 & 41 PARK PLACE,N.Y.

UNITED STATES PATENT OFFICE.

HENRY WELLINGTON, OF NEW YORK, N. Y.

IMPROVEMENT IN VAPOR-BURNING TORCHES.

Specification forming part of Letters Patent No. 162,727, dated April 27, 1875; application filed March 10, 1875.

*To all whom it may concern:*

Be it known that I, HENRY WELLINGTON, of the city, county and State of New York, have invented a certain Improved Vapor-Burning Torch for Lighting Street-Lamps, &c., of which the following is a specification:

This invention has for its object chiefly the lighting of vapor-burners for street-lamps, or those of a similar character; and the invention consists chiefly in combining, with a suitable handle for reaching the burners to be lighted, a reservoir and air-pump, whereby the proper supply of fluid may be easily carried and furnished to the heating-burner, as will hereinafter appear. The invention also embraces certain improvements in the burner, as combined with said handle for carrying and applying it to the burners to be lighted.

Figure 1:
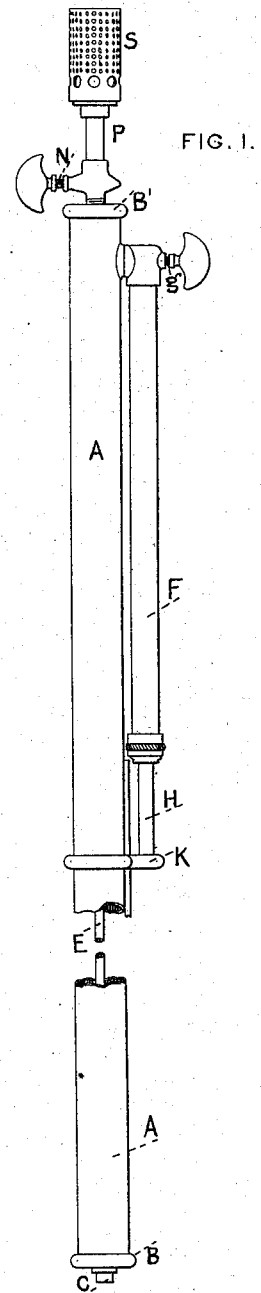
Figure 2:
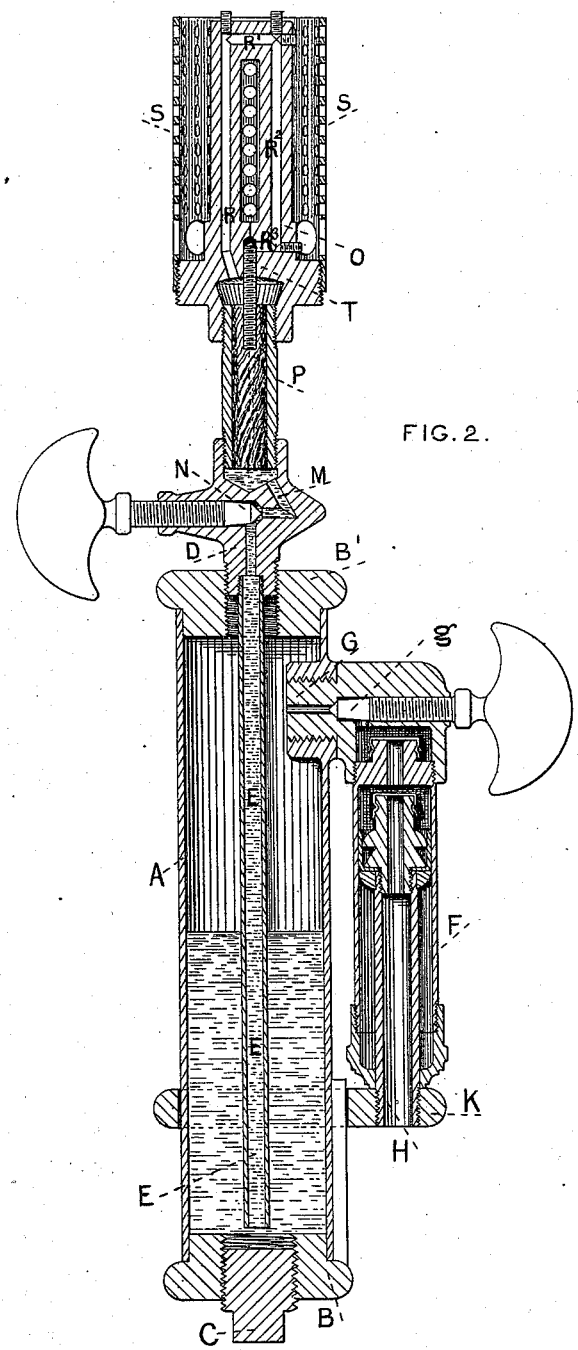

Figure 1 is an exterior view of the torch complete, a portion only being broken out to shorten the handle below the air-pump. Fig. 2 is a sectional view of the torch, nearly full size, but with handle much shortened. At A is represented the handle of the torch, and also the reservoir of the fluid, which is a tube of any convenient size and length for convenient handling and reaching the burners to be lighted. Said tube is partially closed at both ends with caps, as at B B', which serve to receive a screw-plug at the lower end, as at C, to close the reservoir, and at the other end, as at D, to receive the pedestal for the burner.

Within said tubular handle the fluid to supply the burner is kept; being introduced therein through the orifice closed by the plug C, and said fluid is conveyed up to the burner through a small tube, as at E, which reaches from near the stop-cock at the upper end of the handle down to the lower end, so as to carry up all the liquid contained in the reservoir, or nearly so. In order to force the fluid in the handle or reservoir up the tube E, to supply the burner, an air-pump, as at F, is attached to one side of the handle, and has an inlet from the pump into the handle near its upper end, as at G, and said inlet is furnished with a stop-cock, *g*, to prevent the reaction of the air upon the pump. Any suitable kind of an air-pump may be used, and therefore need not here be described, further than to say, that the piston-rod, as at H, is connected with a ring that surrounds the handle, as at K, and which serves as a guide to the piston, as well as a convenient handle by which the air-piston is operated. Said piston-rod is hollow, and takes the air through the center in withdrawing it, and then forces it into the handle or reservoir on the return-stroke. The stuffing-box or guiding-cap that surrounds the said piston is somewhat peculiar, being cup-shaped to a size equal to, or a little less than, the bore of the pump-barrel, so that when occasion requires to introduce the piston into the barrel the cup-shaped valve around the piston is drawn down to the recess of the stuffing-box or cap, and then the cap is screwed onto the barrel or end of the pump-cylinder, and thereby the piston may be easily shoved into the cylinder. This construction of the said box or cap is a great convenience in the use of the cup-shaped piston-packings. By a stroke or two of the air-pump piston a pressure is produced on the fluid in the handle, which forces it up the tube E, to supply the burner, the passage to which is shown at M in Fig. 2, and is provided with a regulating-cock, as at N. The burner proper is shown at O, and is screwed upon the short tube P, which conveys the fluid to the vaporizing chamber or channel, which extends up in one side of the burner-body and across the top, and then down again to near the bottom, and across to the central outlet, as shown by the white channel at R R$^1$ R$^2$ R$^3$ in Fig. 2, and said channel or vaporizing chamber is formed by drilling holes in the body of the burner and closing the outer end by little screw-plugs, as shown in Fig. 2. This long vaporizing-channel expands the fluid to an intense degree of expansion, and as soon as it issues from the jets in the center, so as to combine with the air, furnishes a most rapid combustion, and thereby serves as an intense heater. It is also necessary to control the direction of this intense flame by having a perforated shield, as at S, surround the burner, upon the same principle as that of the Bunsen burner, only that this must admit the air through the perforations to sustain the combustion. A screw-plug is inserted in the lower end of the burner, as at T, to control the direction of the vaporizing-chamber or the gases therein.

Such an apparatus is found in practice to be exceedingly useful in lighting street-lamps which are supplied with vapor-burners, as described in an application for a patent for street-lamps bearing same date with this.

I therefore claim—

1. The combination, in a torch for lighting street-lamps, &c., of a tubular handle, forming a reservoir for the burning-fluid, and an air-pump for producing pressure in said reservoir, as and for the purpose described.

2. The combination, with the handle of a torch, and an air-pump connected therewith, of a ring surrounding said handle and attached to and serving as a guide for the piston of the pump, and a handle by which the piston is operated, substantially as described.

HENRY WELLINGTON.

Attest:
 BOYD ELIOT,
 JOHN WM. RIPLEY.